A. J. LEDDELL.
POULTRY NEST AND FEEDER.
APPLICATION FILED AUG. 14, 1909.

965,308.

Patented July 26, 1910.

2 SHEETS—SHEET 1.

Witnesses
C. E. Johansen
M. L. Lowe

Inventor
Anton J. Leddell
By Woodward & Chandlee
Attorneys

A. J. LEDDELL.
POULTRY NEST AND FEEDER.
APPLICATION FILED AUG. 14, 1909.
965,308.
Patented July 26, 1910.
2 SHEETS—SHEET 2.
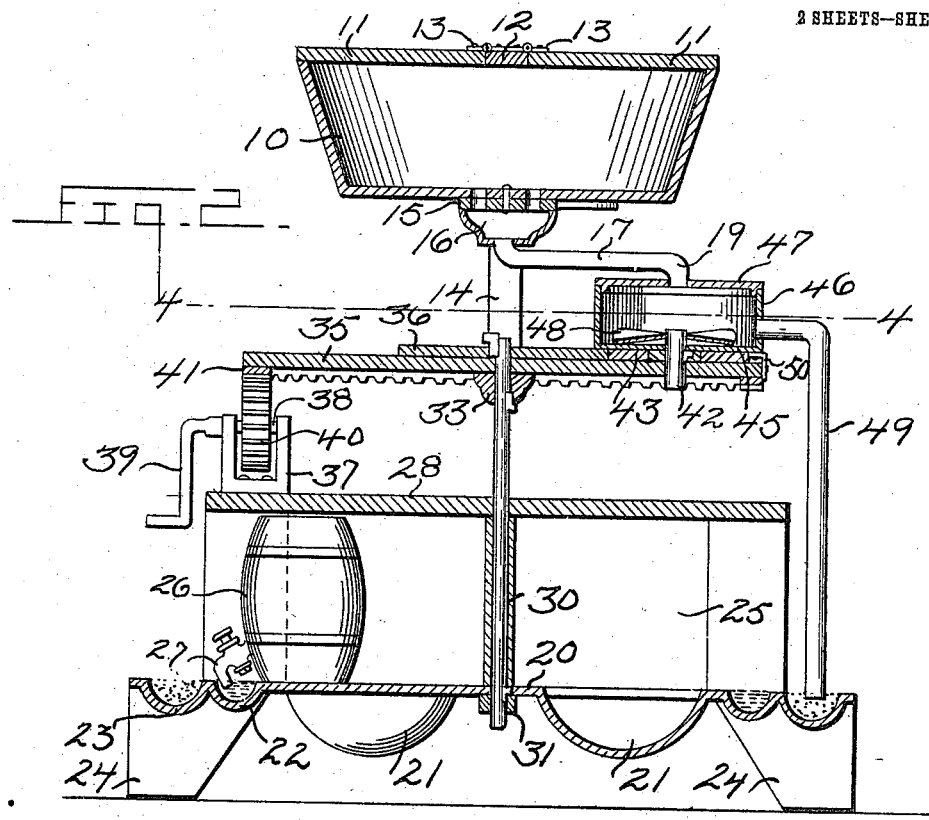
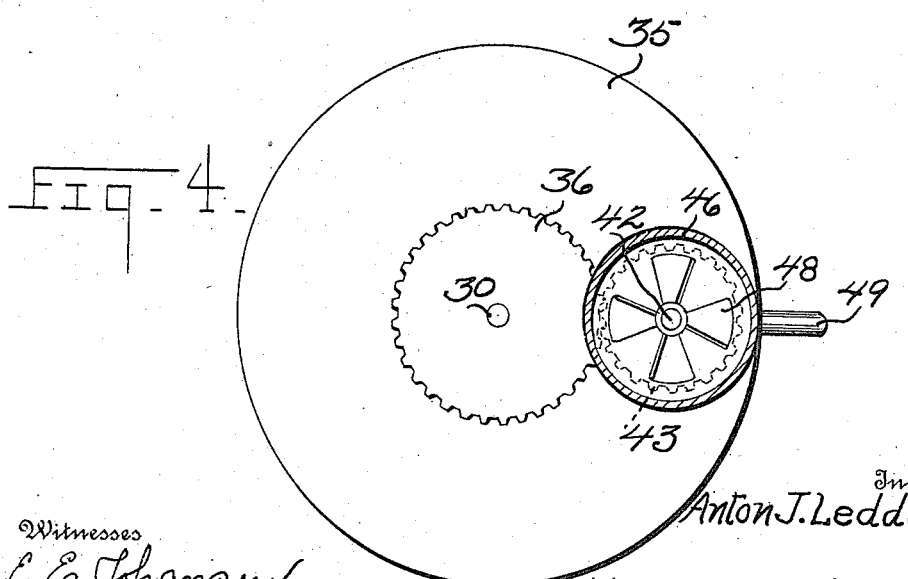
Witnesses
C. E. Johansen
M. L. Lowe
Inventor
Anton J. Leddell.
By Woodward & Chandlee
Attorneys

UNITED STATES PATENT OFFICE.

ANTON J. LEDDELL, OF BONETRAILL, NORTH DAKOTA.

POULTRY NEST AND FEEDER.

965,308.  Specification of Letters Patent.  Patented July 26, 1910.

Application filed August 14, 1909. Serial No. 512,905.

*To all whom it may concern:*

Be it known that I, ANTON J. LEDDELL, a citizen of the United States, residing at Bonetraill, in the county of Williams and State of North Dakota, have invented certain new and useful Improvements in Poultry Nests and Feeders, of which the following is a specification.

This invention relates to certain new and useful improvements in poultry nests.

The primary object of my invention is to provide a nest structure arranged for laying, sitting and brooding hens, so that the fowls may get both feed and water while upon the nest.

A further object is to provide a hen's nest including a feed reservoir, hopper, and means to distribute the feed within a suitable trough.

Another object is to provide a poultry feeding apparatus used in connection with a feed bin, from which the feed is led into a traveling reservoir, from which the feed is distributed into a circular trough.

A still further object is to provide a feed reservoir with an agitating means constructed so that the feed will be mixed within the reservoir.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

Figure 1:
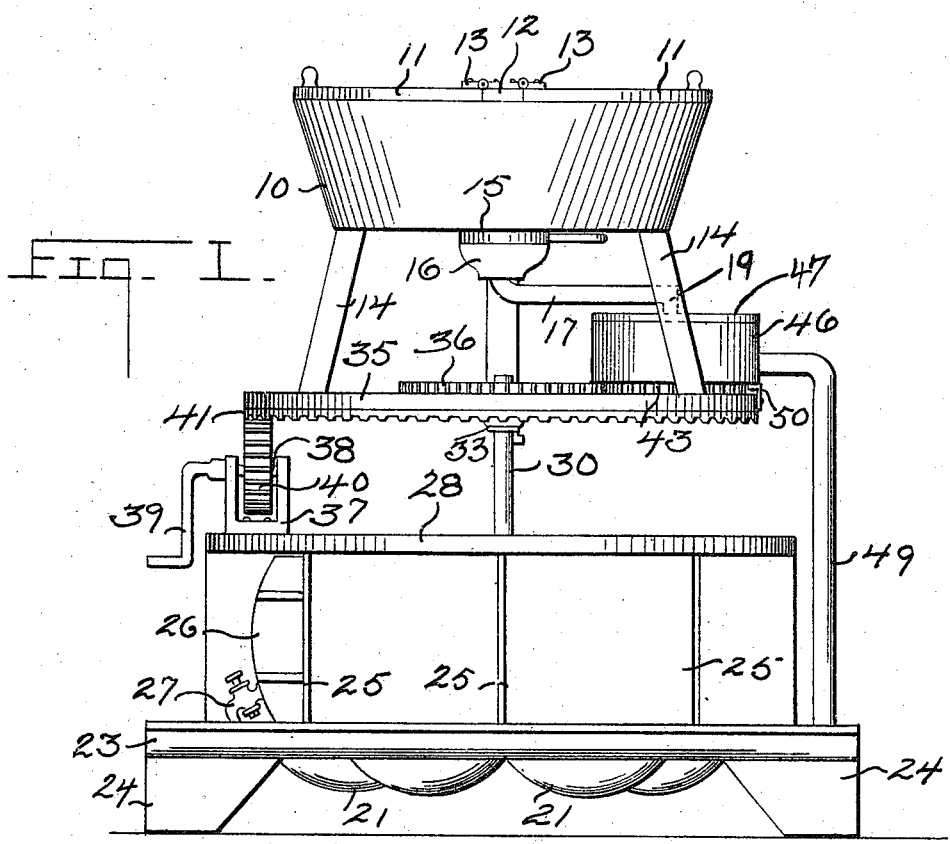
Figure 2:
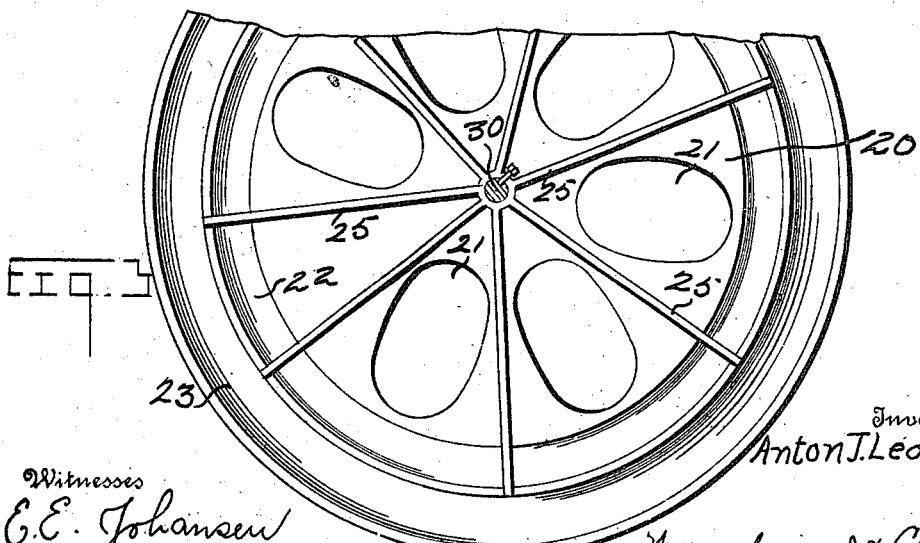

In the drawings forming a portion of this specification, and in which like numerals of reference indicate similar parts in the several views, Figure 1 shows an elevational view of a nest structure embodying my invention, Fig. 2 is a central vertical sectional view through the structure, Fig. 3 shows a fragmentary view disclosing the nest housing, Fig. 4 is a sectional view on the line 4—4 of Fig. 1.

In the accompanying drawings, the numeral 10 designates a feed bin which may be round or square in cross section arranged to hold a suitable amount of feed. This bin is provided with the cross cleat 12 carrying the hinges 13 which hinges in turn support the lids 11 as shown. This bin is supported upon the standards 14 and has a hopper 16 closed by means of valves 15. A feed spout 17 extends from the hopper 16, the spout ending in the crook 19 as disclosed. In connection with this feed bin I employ a suitable nest structure comprising the base member 20 supported by means of the legs 24. This base member is provided with the nest depressions 21 circularly arranged, and surrounding these nest pockets 21 is the shallow circular trough 22, adjacent to which is held the circular trough 23 of a greater width and depth than the water trough 22, this trough 23 being arranged to hold and contain the feed. Each nest is separated from the other by means of a partition 25, one of the compartments which is slightly smaller than the rest is arranged to hold the receptacle 26 within which the water is held, this water receptacle having the stop cock 27 arranged to empty into the water trough 22, as disclosed.

The partitions 25 support the top 28 and held within this top 28 and the central portion of the bottom or base member 20, is the standard or shaft 30, held to the base member by means of the nuts 31 as shown. Near its upper end this shaft 30 is provided with the supporting collar 33, which collar supports the turn table 35. Resting upon this turn table 35 but fixed to the stationary shaft 30, is the gear 36. Secured to the under surface of the turn table 35, is the rack gear 41, this rack gear being engaged by the pinion 40 carried upon the shaft 38 which shaft is supported within the yoke 37. The shaft 38 is operated by means of the crank 39. Revolubly held within the turntable 35 is an arbor 42, this arbor carrying the pinion 43 meshing with the gear 36, and carried by this pinion 43 is the reservoir 46, the arbor 42 extending through the bottom 45 of this reservoir. The pinion 43 it will be noted is of a diameter less than the diameter of the reservoir which is preferably round. This reservoir is provided with the securing ears 50 arranged to receive suitable screws so that this reservoir is fixed to the turntable. Carried upon the arbor 42 within the reservoir 46 are the agitating blades 48 arranged to rotate with the pinion 43. A lid 47 covers this reservoir 46 and has a central opening through which the crooked end 19 of the feed spout 17 extends. Laterally extending from this reservoir 46 is the feed spout 49 which below empties into the feed trough 23 as disclosed.

The operation of my device is very simple. The reservoir 46 is filled from the feed bin 10 in opening the valve 15. The feed then is distributed within the trough 23 in rotating the gear 40 which rotates the turn table 35 to carry the feed spout 49 in the circular path above the trough 23. As the gear 36 is stationary in rotating the turntable 35 the pinion 43 is rotated resulting in these band blades 48 being revolved to thoroughly mix the feed as well as forcing the same laterally outward so that the feed will escape down the feed pipe 49.

The nozzle of the stop cock 27 is so arranged that when the cock is open the water will automatically feed from the receptacle 26 into the water trough 22 as required. The top 28 is further removable so that the nest structure may be readily and conveniently cleaned.

Even while not used as a nest structure, the device serves as a poultry feeder. The supporting legs 24 are of such a height that the water as well as the feed trough may be readily reached by the poultry from the ground. The device is further portable, readily operated and simple of construction, and as the lower end of the feed spout 49 trails within the feed trough 23, there will be no overflow or waste of the feed out of this trough 23.

Having thus described my said invention, what I claim as new and desire to secure by United States Letters Patent is:

1. In combination, a base member having a plurality of nest compartments, a circumscribing feed trough, a turntable held above said trough and a reservoir carried by said turntable emptying into said trough.

2. In combination, a base member having a plurality of nest compartments, a circumscribing feed trough, a shaft held to said base member, a turntable carried by said shaft, and a reservoir carried by said turntable emptying into said trough.

3. In combination, a base member having a plurality of nest compartments, a circumscribing feed trough within said base member, a vertically disposed shaft carried by said base member, a turntable carried by said shaft, a reservoir carried by said turntable, said reservoir emptying into said trough, and means to rotate said turntable.

4. The combination with a base member having a plurality of nest compartments, of a circumscribing feed trough surrounding said nest compartments, a vertically disposed shaft carried by said base member, a turntable carried by said shaft, a feed reservoir emptying into said trough, a gear rack carried by said turntable and a pinion carried by said base member and meshing with said gear rack for rotating said turntable.

5. The combination with a base member having a plurality of nest compartments, of a circumscribing feed trough carried by said base member, a vertical shaft held to said base member, a turntable carried by said shaft, a reservoir carried by said turntable, a spout emptying from said reservoir into said feed trough, agitating blades within said reservoir, a pinion carried by the turntable and secured to said blades and a gear carried by said shaft meshing with said pinion.

6. The combination with a base member having a plurality of nest compartments, of a circumscribing trough within said base member, a vertically disposed shaft carried by said base member, a turntable revolubly carried by said shaft, means to rotate said turntable, a gear carried by said shaft, an arbor carried by said turntable, a pinion carried by said arbor connected with said gear, a reservoir, said arbor extending into said reservoir and being carried by said pinion, agitating blades secured to said arbor within said reservoir, and a feed spout extending from said reservoir and entering into said trough.

7. The combination with a feed bin, of a feed spout extending from said bin, a base member below said feed bin, a feed trough carried by said base member, a shaft carried by said base member, a turntable revolubly secured to said base member, an arbor carried by said turntable, a pinion secured to said arbor, a gear secured to said shaft meshing with said pinion, a reservoir revolubly carried upon said arbor, agitating blades secured to said arbor within said reservoir, said feed pipe emptying into said reservoir, means to rotate said turntable, and a feed spout extending from said reservoir emptying into said trough.

8. The combination with a base member, provided with a feed trough, of a shaft carried by said base member, a turntable revolubly carried by said shaft, a rack gear carried by said turntable, a pinion carried by said base member meshing with said turntable, a gear carried by said shaft, an arbor carried by said turntable, a pinion carried by said arbor meshing with said last mentioned gear, a reservoir carried by said arbor, agitating blades secured to said arbor within said reservoir, a feed spout emptying from said reservoir into said feed trough, a feed bin, and a feed pipe extending from said feed bin into said reservoir.

9. The combination with a base member having a feed and water trough, a water supply emptying into said water trough, a shaft carried by said base member, a turntable carried by said shaft, a gear secured to said shaft, an arbor carried by said turntable, a pinion carried by said arbor meshing with said gear, a reservoir secured to said arbor, blades secured to said arbor within said reservoir, a feed pipe entering from said reservoir into said trough, a feed bin, and a valve controlled feed spout entering from said bin into said reservoir.

In testimony whereof I affix my signature, in presence of two witnesses.

ANTON J. LEDDELL.

Witnesses:
 MATTIE A. LEDDELL,
 OSCAR S. LEDDELL.